United States Patent
Landeborg et al.

[15] 3,653,469
[45] Apr. 4, 1972

[54] BRAKING SYSTEM FOR RAIL VEHICLES

[72] Inventors: Lars Erik Landeborg, Per Albin Hanssons vag 52 B, Malmo; Sune Torsten Henriksson, Kvartsvagen 9; Ragnar Ludvig Muotka, Kyrokogatan 44, both of Kiruna, all of Sweden

[22] Filed: Nov. 20, 1969

[21] Appl. No.: 878,476

[30] Foreign Application Priority Data

Nov. 26, 1968 Sweden..................16064/68

[52] U.S. Cl............................188/58, 188/218 R, 188/264 R
[51] Int. Cl..........................................................B61h 1/00
[58] Field of Search......................188/33, 58, 218 R, 264 R

[56] References Cited

UNITED STATES PATENTS

| 546,609 | 9/1895 | Dearing | 188/58 X |
|---|---|---|---|
| 2,508,336 | 5/1956 | Oelkers | 188/58 |
| 2,679,304 | 5/1954 | Horn | 188/218 |

FOREIGN PATENTS OR APPLICATIONS

| 51,302 | 2/1936 | Denmark | 188/264 |
| 448,261 | 6/1936 | Great Britain | 188/264 |

Primary Examiner—Duane A. Reger
Attorney—Janes & Chapman

[57] ABSTRACT

A wheel axle unit comprising a frame, at least one axle and at least one wheel at each end of said axle is provided with a braking system comprising a tubular brake roller at least partially surrounding said axle and spaced therefrom, said brake roller being unrotatably connected to at least one of said wheels, and a pair of brake shoes adapted to engage the outer surface of said brake roller during braking. In a preferred embodiment of the invention the braking roller has a flared end portion provided with radially extending flanges constituting a centrifugal fan for generating a stream of air cooling the brake roller.

6 Claims, 3 Drawing Figures

BRAKING SYSTEM FOR RAIL VEHICLES

BACKGROUND OF THE INVENTION

The present invention relates to braking systems and more particularly to a braking system for rail vehicles.

As a rule it is desirable that rail vehicles, particularly railway vehicles for carrying bulky goods, such as semi-trailers, containers, general cargo and piece goods, pulpwood, etc., have a small height in order that as large a load as possible may be accommodated within the loading gauge. In order that the vehicle may obtain this low height it is desirable to provide it with wheels of a small diameter but usable from practical viewpoints. A small wheel diameter entails problems of various kinds. One of the more difficult problems is how to design the vehicle braking system. In order not to encroach on the clearance space beneath the wheel axles it is consequently necessary when using a small wheel diameter to dispose the bearing devices of the wheel axle unit inside the wheels. In those cases, however, the wheels cannot be braked by means of such brake shoes as engage directly with the periphery of the wheel since the wheels will be heated to such a degree that the bearing means disposed therein are damaged.

The object of the invention is therefore to provide a braking system for vehicles having wheel axle units and wheels of a small diameter, said braking system being designed in order to permit such a cooling of the system during braking that the bearing means of the wheel axle unit are not damaged even if they should be disposed inside the wheels and which is not designed in such a way as to encroach on the clearance space in the area of the wheel axle unit.

SUMMARY OF THE INVENTION

According to the invention there is provided in a wheel axle unit comprising frame means, at least one axle, at least two wheels one at each end of said axle, means mounting said axle to said frame means and bearing means rotatably mounting said wheels to said axle, a braking system comprising brake roller means at least partially surrounding said axle and spaced therefrom, means unrotatably connecting said brake roller means to at least one of said wheels, and brake shoe means engageable with the outer surface of said roller means.

According to the invention there is also provided a braking system comprising a tubular brake roller, said brake roller having a flared portion at one end thereof, said flared portion being provided with inwardly projecting, radially extending fins providing a set of centrifugal fan blades, and brake shoe means engageable with the outer surface of said roller.

Despite the fact that the wheels have a very small diameter a large cooling surface may be obtained as a result of the braking roller being given a considerable length and since the wheel periphery is not heated, shock-absorbing rubber layers may be mounted in the wheels, which reduces the dynamic surface pressure and consequently the wear, and the wheel bearings may be mounted in the wheels, which is a prerequisite in connection with small wheel dimensions in order that the standardized clearance space may be maintained.

According to a preferred embodiment of the invention the braking roller is provided with inwardly directed cooling fins and the braking roller flares in a direction towards the wheel in such a way that the fins adjacent the wheel merge into fan blades of a centrifugal fan formed thereby, which acts at the rotation of the wheel in such a way as to suck in air through a space between the braking roller and the axle, simultaneously cooling the braking roller.

BRIEF DESCRIPTION OF THE DRAWINGS

In order that the invention may be fully understood, it will now be described with reference to the accompanying drawings in which.

DESCRIPTION OF PREFERRED EMBODIMENTS

Figure 1:
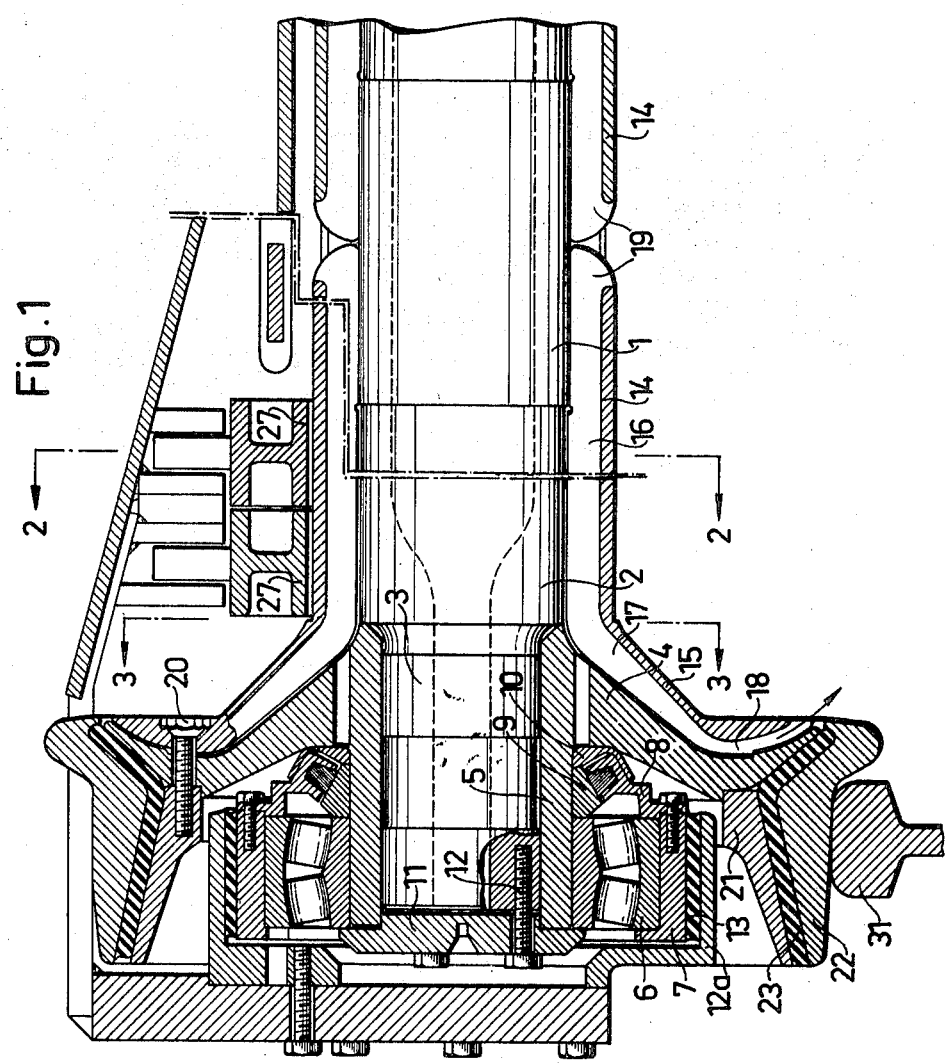
FIG. 1 shows an axial section through a wheel axle unit provided with a braking system according to the invention.
Figure 2:
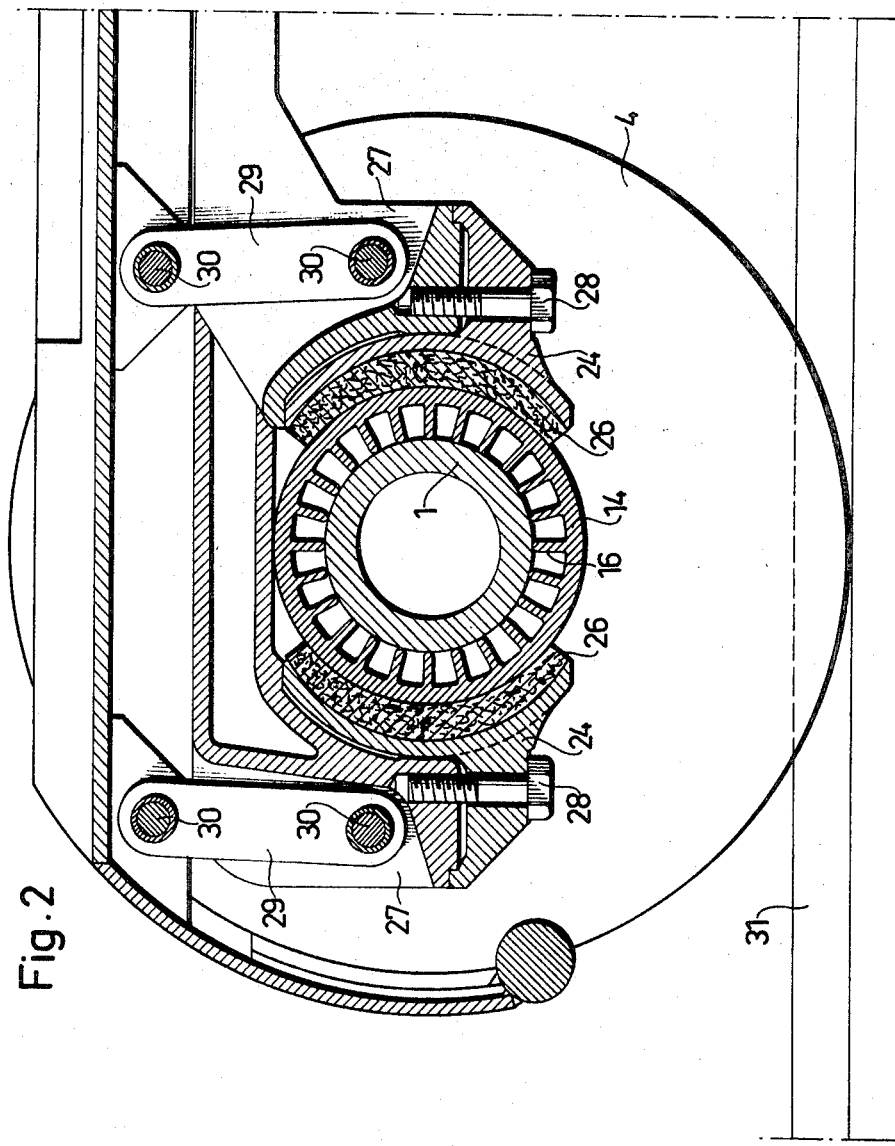
FIG. 2 shows a section on line 2—2 in FIG. 1.
Figure 3:
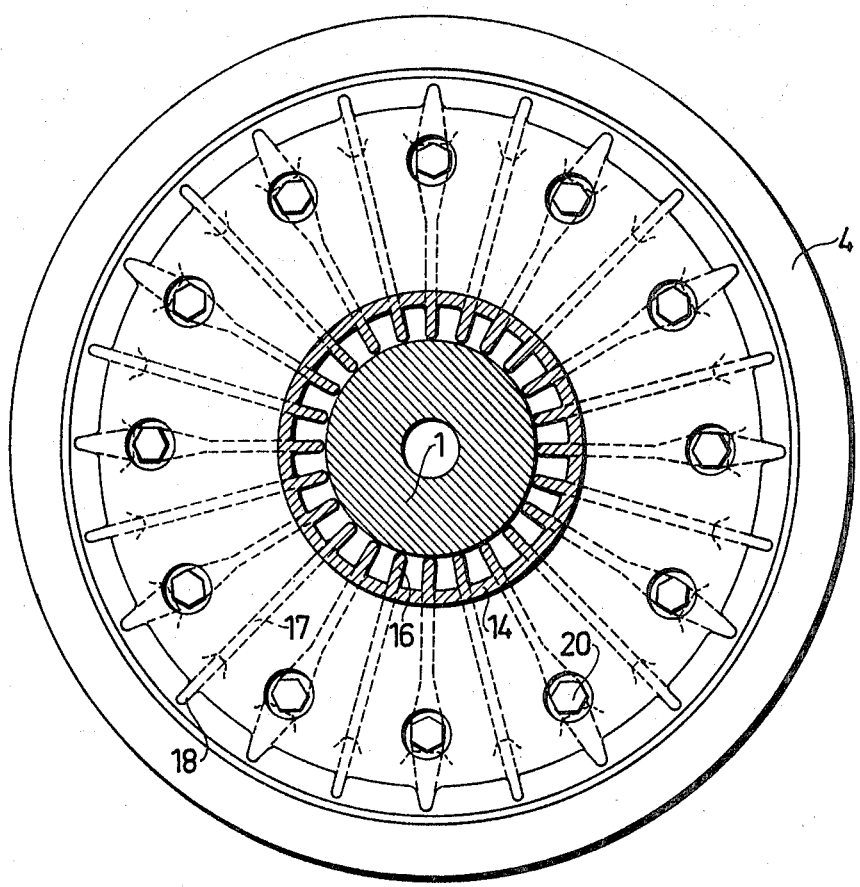
FIG. 3 shows a section on line 3—3 in FIG. 1.

The wheel axle unit provided with the braking system according to the invention comprises a tubular axle 1 having at each end an interior portion 2 of thicker material and a tapering portion 3 of reduced outer diameter. On each one of these portions 3 having a reduced diameter there is provided a wheel 4, the hub 5 of which encloses the respective portion 3. On the outside of each one of the hubs there is provided a bearing 6 which is enclosed by an inner housing 7. The bearing housing 7 has a bearing cover 8 provided with a sealing means, and outside the end thereof and in contact with the hub 5 there are provided two sealing rings 9 and 10, respectively. A pressure washer 11 is screwed by means of bolts 12 to the end of the axle and due to the fact that it rests against the bearing 6 at its periphery it will fix the wheel in relation to the axle, the bearing and the sealing rings. Outside the inner bearing housing there is provided an outer bearing housing 12a below an intermediate rubber layer 13. The outer housing 12a is in turn screwed to the frame of the vehicle, in this case a railway bogey, in which the wheel axle unit is provided. The axle 1 is surrounded by two braking rollers 14, each of which is provided with a hopper-shaped portion 15 which largely corresponds to the contour of the respective wheel 4 of the wheel axle unit. The braking rollers 14 are provided at their inner surface with cooling fins 16 merging at the respective hopper-shaped portion 15 in radially axial centrifugal fan blades 17, and these in turn merge gradually in radial fan blades 18. When the wheels 4 rotate the fan blades act in such a way as to suck in air at a cooling air intake 19 which is common for both braking rollers 14 and disposed at the middle of the axle, the air sucked in being guided between the fins 16 up to the fan blades, where the air is discharged at an opening located at the end of the radial fan blades 18. This air will consequently cool the braking rollers efficiently during braking. The braking rollers 14 are fixed to the respective wheels 4 at the hopper-shaped portion 15 by means of bolts 20, said bolts 20 also extending into a conical clamping ring 21 located at the other side of the wheel in relation to the hopper-shaped portion, in such a way that the V-shaped rubber layer 23 disposed between the wheel, the conical clamping ring 21 and an outer wheel ring 22 will be compressed between the said portions.

On both sides of the braking rollers there are provided two brake shoes 24, each provided with a brake lining 26 and extending in their longitudinal direction essentially the same length as the cylindrical portion of the braking rollers 14. The brake shoes 24 are carried by retaining members 27 to which the brake shoes are fixed by means of bolts 28. The retaining members 27 are in turn suspended on arms 29 by means of pins 30 and the retaining members 27 are consequently movably connected with the frame of the vehicle.

When the wheel rim 22 rotates at speeds around 120 km per hour on a rail 31, high frequency vibrations are generated which are dampened by the rubber layer 23 which can absorb both radial and axial forces because it is compressed and is of V-shape. The bearing 6 provided between the wheel hub 5 and the inner bearing housing 7 is cylindrical and may consequently be surrounded by the dampening rubber layer 13, the principal purpose of which is to permit the two layers of the bearing 6, despite the necessary manufacturing tolerances and movements because of heat expansion and the like, to receive in common such axial forces as are exerted on the wheel axle unit. Between the flanges 16 and the fan blades 17 and 18 on one side and the axle 1 and the wheel 4 on the other there is contact only at the center of the axle 1 and at the bolts 20 which retain the hopper-shaped portion 15 of the braking rollers 14 to the wheels 4. Only a very insignificant part of the heat which is generated during braking can therefore be transmitted to the heat sensitive bearings 6. During high rotational speeds the fan blades 17 and 18 suck in large volumes of air from the air intake 19 at the middle of the axle and along the cooling fins 16, for which reason a considerable part of the heat generated during braking is carried away with the air, which in turn entails that overheating of the braking rollers and the brake shoes does not have to be expected.

This embodiment of the wheel axle unit and in particular of its braking system has made it possible to provide a wheel axle unit which does not encroach on the clearance space beneath the axle and between the wheels despite the fact that the unit has a cooling surface which is large and efficient in relation to its dimensions.

Due to the fact that braking of the wheel periphery is not required friction lining may be used in the brake shoes without risk that the linings will be soiled, whereby the brake shoes obtain a relatively long life. The brake shoes are easily accessible for replacement and are only retained by two bolts each.

The wheel axle has a high loading capacity in relation to its weight and since the separate details are small they may be manufactured at a low price. The wheel rim may be tempered to the highest degree of hardness and can easily be replaced together with the braking roller when it is worn down. Returning of the wheel rim is not necessary and the mounting and maintenance costs are therefore low.

It is evident that the use of the braking system in accordance with the invention is not restricted to wheel axle units for railway vehicles but the braking system may be used in all connections where powerful cooling of the braking system during braking is required in a restricted space.

We claim:

1. In a wheel axle unit comprising frame means, at least one axle, at least two wheels, one at each end of the axle, means mounting the axle to the frame means, and bearing means rotatably mounting the wheels to the axle, the improvement which comprises a braking system comprising brake roller means having an exterior brake shoe receiving surface and an interior cooling surface along and at least partially surrounding the axle and closely spaced therefrom at its interior surface, fixedly connected at one end to at least one of the wheels, and having an opening for entry of air into the space between the axle and the inside of the roller means, the brake roller means extending along the axle and having a large cooling surface exposed to air flow along its interior surface for dissipation of heat generated during braking and to inhibit heat damage of the bearing means mounting the wheels to the axle, and external brake shoe means engageable with the exterior surface of the brake roller means, the brake roller means at the end attached to the wheel being flared, and the flared portion being spaced from the wheel, and being provided with inwardly projecting radially extending fins projecting into said space constituting a set of centrifugal fan blades and a set of passages between the flared portions and the wheel for drawing cooling air through the space between the brake roller means and the axle when the brake roller means is rotating about the axle with the wheel.

2. In a wheel axle unit comprising a frame, an axle, two wheels disposed one at each end of the axle, means fixedly mounting the axle to the frame and bearing means rotatably mounting the wheels to the axle, the improvement which comprises a braking system comprising two tubular brake rollers each having an exterior brake shoe receiving surface and an interior cooling surface surrounding the axle and closely spaced therefrom at its interior surface, each fixedly connected at one end to a wheel, the end attached to the wheel being flared and spaced from the wheel, and each provided at its interior surface with longitudinally extending cooling fins projecting into the space between the axle and the roller and merging at the flared end portion in radially axial centrifugal fins which in turn merge in radial fan blades, the blades providing passages in the space between the flared end portions and the wheels, the tubular brake rollers extending from the wheels towards each other, with a space therebetween providing ingress for air into the space between the brake rollers and the axle and the flared ends of the brake rollers and the wheels, and external brake shoes engageable over substantially the entire exterior brake shoe receiving surfaces of the braking rollers, for braking rotational movement of the rollers and thereby of the wheels fixed thereto.

3. A wheel axle unit comprising frame means, an axle, means for connecting the axle to the frame, two wheels, disposed one at each end of the axle, bearing means rotatably mounting the wheels to the axle, brake roller means having an exterior brake shoe receiving surface and an interior cooling surface at least partially surrounding the axle, closely spaced therefrom at its interior surface and extending longitudinally along the axle a sufficient distance to provide for dissipation of heat generated during braking, and inhibit heating of the bearing means rotatably mounting the wheels to the axle, the brake roller means having a flared portion at one end adjacent the wheel to which it is connected, the flared portion being spaced from the wheel, and being provided with inwardly projecting fins extending into the space, and providing a set of passages between the flared portion and the wheel and also providing a set of centrifugal fan blades for drawing cooling air through the space between the brake roller means and the axle and through the passages, and brake shoe means extending substantially the length of each brake roller means and engageable with the exterior brake shoe receiving surface of the roller means, for braking rotational movement of the rollers and thereby of the wheels.

4. A wheel axle unit comprising frame means, an axle, means for connecting the axle to the frame, two wheels, disposed one at each end of the axle, each wheel comprising a hub portion, a wheel ring, a clamping ring disposed inside the wheel ring, and a rubber layer disposed within the wheel ring and clamping ring dampening high frequency radiations generated by the wheel rim at high rotational speeds on a rail, bearing means rotatably mounting the wheels to the axle, brake roller means having an exterior brake shoe receiving surface and an interior cooling surface at least partially surrounding the axle, closely spaced therefrom at its interior surface and extending longitudinally along the axle a sufficient distance to provide for dissipation of heat generated during braking, and inhibit heating of the bearing means rotatably mounting the wheels to the axle, and brake shoe means extending substantially the length of each brake roller means and engageable with the exterior brake shoe receiving surface of the roller means, for braking rotational movement of the rollers and thereby of the wheels.

5. A wheel axle unit according to claim 4, in which the bearing means is provided between an outer surface of the hub portion and the portion of the frame.

6. A braking system comprising a tubular brake roller having an exterior brake shoe receiving surface and an interior cooling surface adapted to extend along a substantial longitudinal length of an axle, having means for mounting to a wheel at one end, in a position spaced from the axle, and open at the other end to provide an ingress for air into the space between the roller and the axle, the portion adapted to be fixed to the wheel being flared, and adapted to be fixed to the wheel at a point spaced from the wheel, the flared portion at its side wall being provided with inwardly projecting radially extending fins extending into the space and providing a set of centrifugal fan blades to impart spiral movement of air through the space, and brake shoe means extending over substantially the length of the outer surface of the roller, and engageable with the outer surface to brake rotational movement of the roller about the axle.

* * * * *